United States Patent
Levin et al.

(10) Patent No.: US 7,453,396 B2
(45) Date of Patent: Nov. 18, 2008

(54) RADIOTERMINALS AND ASSOCIATED OPERATING METHODS THAT ALTERNATE TRANSMISSION OF WIRELESS COMMUNICATIONS AND PROCESSING OF GLOBAL POSITIONING SYSTEM SIGNALS

(75) Inventors: Lon C. Levin, Washington, DC (US); Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 265 days.

(21) Appl. No.: 11/098,288

(22) Filed: Apr. 4, 2005

(65) Prior Publication Data

US 2006/0232465 A1 Oct. 19, 2006

(51) Int. Cl.
*G01S 1/00* (2006.01)
*G01S 5/00* (2006.01)
*H04B 7/185* (2006.01)

(52) U.S. Cl. ............................. 342/357.1; 342/357.09; 342/357.07

(58) Field of Classification Search ................. 342/357, 342/357.01–357.017
See application file for complete search history.

(56) References Cited

U.S. PATENT DOCUMENTS

| | | | |
|---|---|---|---|
| 4,402,049 A * | 8/1983 | Gray ........................ | 701/205 |
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |

(Continued)

FOREIGN PATENT DOCUMENTS

EP 0 506 255 A2 9/1992

(Continued)

OTHER PUBLICATIONS

Notification of Transmittal of the International Search Report and the Written Opinion of the International Searching Authority, or the Declaration, Written Opinion of the International Searching Authority and International Search Report, PCT/US2006/003261, Oct. 17, 2006.

(Continued)

*Primary Examiner*—Thomas H Tarcza
*Assistant Examiner*—Harry Liu
(74) *Attorney, Agent, or Firm*—Myers Bigel Sibley & Sajovec, P.A.

(57) ABSTRACT

A radioterminal includes a wireless communications transmitter, a wireless communications receiver and a GPS receiver. A controller is configured to enable the GPS receiver when the wireless communications receiver is receiving wireless communications, and to disable the GPS receiver when the wireless communications transmitter is transmitting wireless communications. Related methods also are described.

23 Claims, 3 Drawing Sheets

U.S. PATENT DOCUMENTS

| | | | |
|---|---|---|---|
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,883,594 A | 3/1999 | Lau | |
| 5,884,142 A | 3/1999 | Wiedeman et al. | |
| 5,905,460 A | 5/1999 | Odagiri et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,041,222 A | 3/2000 | Horton et al. | |
| 6,052,560 A | 4/2000 | Karabinis | |
| 6,052,586 A | 4/2000 | Karabinis | |
| 6,067,044 A | 5/2000 | Whelan et al. | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,097,974 A | 8/2000 | Camp, Jr. et al. | |
| 6,101,385 A | 8/2000 | Monte et al. | |
| 6,107,960 A * | 8/2000 | Krasner | 342/357.09 |
| 6,108,561 A | 8/2000 | Mallinckrodt | |
| 6,134,437 A | 10/2000 | Karabinis et al. | |
| 6,141,570 A * | 10/2000 | O'Neill et al. | 455/574 |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,282,495 B1 | 8/2001 | Kirkhart et al. | |
| 6,324,405 B1 | 11/2001 | Young et al. | |
| 6,339,707 B1 | 1/2002 | Wainfan et al. | |
| 6,397,147 B1 * | 5/2002 | Whitehead | 701/213 |
| 6,418,147 B1 | 7/2002 | Wiedeman | |
| 6,421,001 B1 * | 7/2002 | Durst et al. | 342/357.07 |
| 6,424,826 B1 | 7/2002 | Horton et al. | |
| 6,442,375 B1 * | 8/2002 | Parmentier | 455/78 |
| 6,448,925 B1 * | 9/2002 | Shridhara | 342/357.02 |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,710,738 B2 * | 3/2004 | Allen, Jr. | 342/357.1 |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,850,188 B1 | 2/2005 | Lee et al. | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,975,941 B1 * | 12/2005 | Lau et al. | 701/213 |
| 6,999,720 B2 | 2/2006 | Karabinis | |
| 7,006,789 B2 | 2/2006 | Karabinis et al. | |
| 7,176,833 B2 | 2/2007 | Jendbro et al. | |
| 7,256,732 B2 * | 8/2007 | De Salas et al. | 342/357.07 |
| 2002/0041575 A1 | 4/2002 | Karabinis et al. | |
| 2002/0090942 A1 | 7/2002 | Karabinis et al. | |
| 2002/0107033 A1 * | 8/2002 | Kim | 455/456 |
| 2002/0111171 A1 | 8/2002 | Boesch et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0050039 A1 | 3/2003 | Baba et al. | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0080897 A1 | 5/2003 | Tranchina et al. | |
| 2003/0149986 A1 | 8/2003 | Mayfield et al. | |
| 2003/0153267 A1 | 8/2003 | Karabinis | |
| 2003/0153308 A1 | 8/2003 | Karabinis | |
| 2003/0157944 A1 * | 8/2003 | Nakao et al. | 455/456 |
| 2003/0224785 A1 | 12/2003 | Karabinis | |
| 2004/0063447 A1 | 4/2004 | Yokouchi | |
| 2004/0072539 A1 | 4/2004 | Monte et al. | |
| 2004/0093158 A1 * | 5/2004 | Fielder | 701/213 |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0203879 A1 * | 10/2004 | Gardner et al. | 455/456.1 |
| 2004/0239559 A1 * | 12/2004 | King et al. | 342/357.12 |
| 2004/0240525 A1 | 12/2004 | Karabinis et al. | |
| 2005/0024265 A1 * | 2/2005 | Stilp et al. | 342/465 |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0064903 A1 * | 3/2005 | Uotsu et al. | 455/556.1 |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |
| 2006/0105758 A1 * | 5/2006 | Maislos | 455/420 |
| 2006/0211412 A1 * | 9/2006 | Vance | 455/418 |

FOREIGN PATENT DOCUMENTS

| | | |
|---|---|---|
| EP | 0 597 225 A1 | 5/1994 |

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 797 319 A2 | 9/1997 |
| EP | 1 122 554 A1 | 8/2001 |
| WO | WO 99/36795 A1 | 7/1999 |
| WO | WO 01/54314 A1 | 7/2001 |
| WO | WO 02/063783 A2 | 8/2002 |
| WO | WO 2004/001993 A1 | 12/2003 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

\* cited by examiner

RADIOTERMINALS AND ASSOCIATED OPERATING METHODS THAT ALTERNATE TRANSMISSION OF WIRELESS COMMUNICATIONS AND PROCESSING OF GLOBAL POSITIONING SYSTEM SIGNALS

FIELD OF THE INVENTION

This invention relates to radioterminal communications devices and methods, and more particularly to radioterminal communication devices and methods that include Global Positioning System (GPS) capabilities.

BACKGROUND OF THE INVENTION

Cellular wireless communications systems, methods and radioterminals are widely used for voice and/or data communications. As is well known to those having skill in the art, cellular wireless communications systems, methods and radioterminals include terrestrial cellular wireless communications systems, methods and radioterminals, and/or satellite cellular wireless communications systems, methods and mobile terminals. As used herein, the term "radioterminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer and/or calendar; and/or conventional laptop and/or palmtop computers or other appliances, which include a radio frequency transceiver. A radioterminal also may be referred to herein as a "wireless terminal" or simply as a "terminal". As used herein, the term (s) "radioterminal", "wireless terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s).

It may be desirable, and may be mandatory in the future, that radioterminals be equipped to determine the geographical location thereof, for example, to support emergency position reporting, often referred to as "E911" position reporting. One way to accomplish this result is to add a GPS receiver to a radioterminal. As is well known to those having skill in the art, GPS is a satellite navigation system that is funded by and controlled by the U.S. Department of Defense, that provides specially coded satellite signals that can be processed in a GPS receiver, enabling the receiver to compute position, velocity and/or time. As used herein, the term "GPS" also includes other satellite-based systems that can be used to measure positions on the earth, such as GLONASS.

GPS receivers may be expensive, increase radioterminal size and/or consume the limited amount of battery power that is available to the radioterminal. Accordingly, techniques have been proposed to integrate some or all of a GPS receiver into a radioterminal. See, for example, U.S. Pat. No. 6,424, 826 to Horton et al., entitled Systems and Methods for Sharing Reference Frequency Signals Within a Wireless Mobile Terminal Between a Wireless Transceiver and a Global Positioning System Receiver; U.S. Pat. No. 6,097,974 to Camp, Jr. et al., entitled Combined GPS and Wide Bandwidth Radiotelephone Terminals and Methods; and U.S. Pat. No. 6,041, 222 to Horton et al., entitled Systems and Methods for Sharing Reference Frequency Signals Within a Wireless Mobile Terminal Between a Wireless Transceiver and a Global Positioning System.

It is also known to add a GPS mode filter to a combined radioterminal/GPS terminal, as described in U.S. Pat. No. 6,785,543 to coinventor Karabinis, entitled Filters for Combined Radiotelephone/GPS Terminals, assigned to the assignee of the present invention, the disclosure of which is hereby incorporated herein by reference in its entirety as if set forth fully herein.

SUMMARY OF THE INVENTION

Radioterminals according to some embodiments of the present invention include a wireless communications transmitter, a wireless communications receiver, and a GPS receiver. These radioterminals also include a controller that is configured to enable the GPS receiver when the wireless communications receiver is receiving wireless communications, and to disable the GPS receiver when the wireless communications transmitter is transmitting wireless communications. Accordingly, overload and/or other degradation that is induced in the GPS receiver by the wireless communications transmitter may be reduced or eliminated.

In some embodiments, the controller is further configured to disable the wireless communications transmitter and enable the GPS receiver when the GPS receiver has been disabled for a predetermined time. In still other embodiments, the controller is further configured to enable the GPS receiver when the wireless communications receiver is receiving wireless communications to determine a position of the radioterminal and to disable the GPS receiver when the wireless communications transmitter is transmitting wireless communications to transmit the position of the terminal and/or to transmit other information. In still other embodiments of the present invention, the controller is further configured to enable the GPS receiver when the wireless communications transmitter is not transmitting wireless communications and the wireless communications transmitter is not receiving wireless communications.

According to some embodiments of the present invention, the GPS receiver includes a GPS radio frequency (RF) system and a GPS signal processing system. In these embodiments, the controller may be configured to disable the GPS receiver by disabling the GPS RF system and/or the GPS signal processing system. In other embodiments, the wireless communications transmitter comprises a wireless communications transmitter RF system and a wireless communications transmitter signal processing system. In these embodiments, the controller is configured to disable the wireless communications transmitter by disabling the wireless communications transmitter RF system and/or the wireless communications transmitter signal processing system.

Radioterminals according to exemplary embodiments of the present invention may also be regarded as switching between two modes. In the first mode, the GPS receiver is disabled and the wireless communications transmitter is enabled. In the second mode, the GPS receiver is enabled and the wireless communications transmitter is disabled. In some embodiments, the wireless communications receiver may also be enabled in the first and/or second mode. In some embodiments, the radioterminal switches to the second mode when the radioterminal has been in the first mode for a predetermined time. Operation in the second mode may determine the position of the radioterminal, and operation in the first mode may transmit the position of the radioterminal.

It will be understood that, as used herein, the term "enable" contemplates the selective activation of a component when its use is desired, or the continuous activation of the component. Finally, it will be understood that, although embodiments of the invention have been described above in connection with radioterminals, other embodiments of the present invention provide analogous methods of operating radioterminals.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first component below could be termed a second component, and similarly, a second component may be termed a first component without departing from the teachings of the present invention. As used herein, the term "and/or" includes any and all combinations of one or more of the associated listed items. The symbol "/" is also used as a shorthand notation for "and/or".

Figure 1:
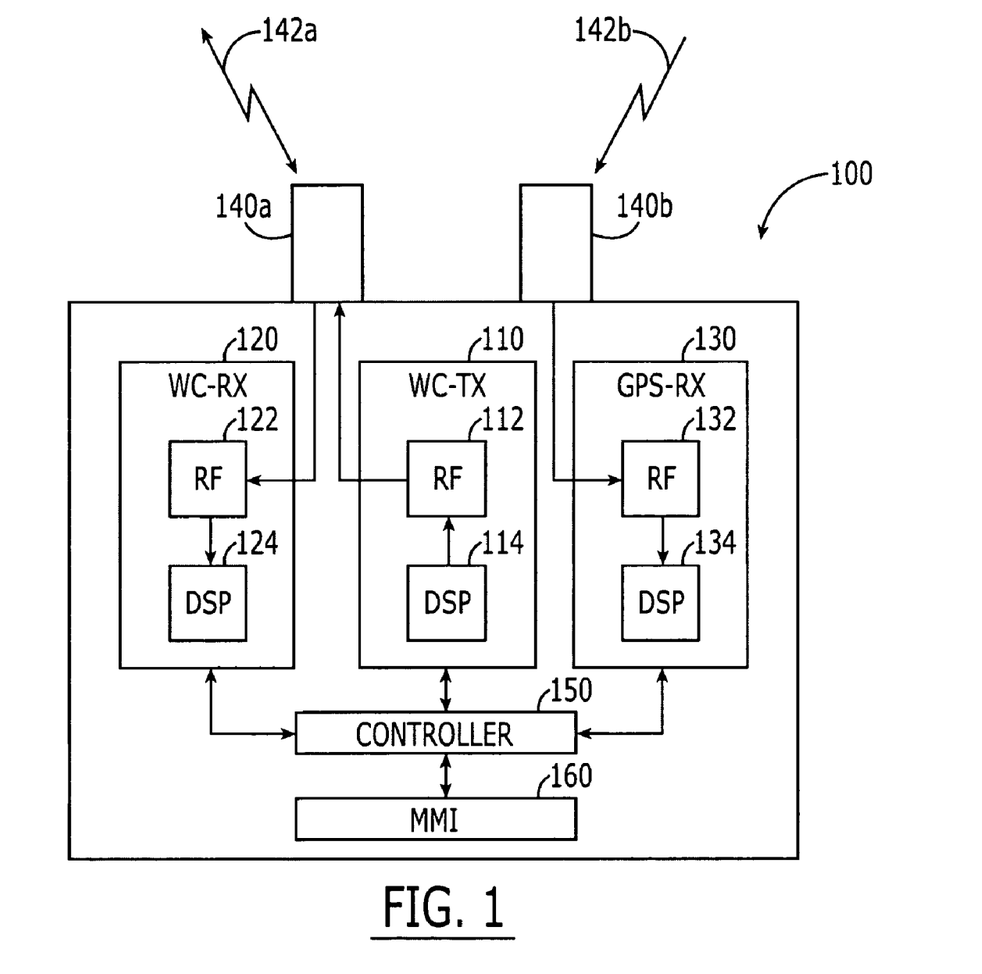
FIG. 1 is a functional block diagram of a radioterminal according to exemplary embodiments of the present invention.

FIG. 1 is a functional block diagram of a radioterminal according to exemplary embodiments of the present invention. These radioterminals 100 can communicate with a cellular and/or PCS wireless communications system, a satellite wireless communications system and/or an ancillary terrestrial network that is configured to terrestrially use and/or reuse one or more satellite band frequencies. An ancillary terrestrial network that terrestrially uses and/or reuses satellite band frequencies is described in U.S. Pat. No. 6,684,057 to Karabinis, entitled Systems and Methods for Terrestrial Reuse of Cellular Satellite Frequency Spectrum; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,785,543 to Karabinis, entitled Filters for Combined Radiotelephone/GPS Terminals; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; Published US 2003/0054762 to Karabinis, entitled Multi-Band/Multi-Mode Satellite Radiotelephone Communications Systems and Methods; US 2003/0224785 to Karabinis, entitled Systems and Methods for Reducing Satellite Feeder Link Bandwidth/Carriers In Cellular Satellite Systems; Published US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and Published US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Still referring to FIG. 1, these radioterminals 100 include a wireless communications transmitter (WC-TX) 110, a wireless communications receiver (WC-RX) 120, and a GPS receiver (GPS-RX) 130. The wireless communications transmitter 110 includes a wireless transmitter radio frequency (RF) system 112 and a digital signal processor (DSP) 114. The wireless communications receiver 120 includes a wireless communications receiver RF system 122 and a wireless communications receiver DSP 124. The GPS receiver 130 includes a GPS RF system 132 and a GPS DSP 134. The design and operation of the wireless communications transmitter 110, the wireless communications receiver 120, the GPS receiver 130, and the components thereof, are well known to those having skill in the art, and need not be described further herein.

It will be understood that FIG. 1 is a functional block diagram, so that some or all of the wireless communications transmitter 110, the wireless communications receiver 120 and/or the GPS receiver 130 may be integrated, at least in part, as described, for example, in the above-cited U.S. Pat. Nos. 6,041,222, 6,097,974 and/or 6,424,826, and/or using other conventional techniques. Along these lines, it also will be understood that the wireless communications transmitter 110 and the wireless communications receiver 120 may transmit and receive wireless communications 142*a* through a common wireless communications antenna 140*a*, and the GPS receiver 130 may receive GPS signals 142*b* through a GPS antenna 140*b*. In other embodiments, however, three separate antennas may be provided, or the antennas 140*a* and 140*b* may be integrated into a single antenna. Finally, it also will be understood that the RF systems 112, 122 and/or 132 may include non-radio frequency components, to provide a front end system, and that the DSPs 114, 124 and/or 134 may include analog components and/or other digital (discrete-time) components, as well.

Still referring to FIG. 1, a controller 150 also is provided in the radioterminals 100. The controller 150 interfaces with the wireless communications transmitter 110, the wireless communications receiver 120 and the GPS receiver 130, and also interfaces with a man-machine interface (MMI) 160, also generally referred to as a user interface, that can include a speaker, microphone, keypad, pointing device, display and/or other user devices. Other components also may be provided in the wireless terminal 100, such as one or more short range ad hoc wireless connection systems and/or other wireless connection systems, as is/are well known to those having skill in the art. It also will be understood that the functionality of the controller 150 may be integrated, at least in part, with at least some functionality of the wireless communications transmitter 110, the wireless communications receiver 120, the GPS receiver 130, and/or the MMI 160.

According to some embodiments of the present invention, the controller 150 is configured to enable the GPS receiver 130 when the wireless communications receiver 120 is receiving wireless communications 142*a*, and to disable the GPS receiver 130 when the wireless communications transmitter 110 is transmitting wireless communications 142*a*. Accordingly, overload and/or degradation of the GPS receiver 130 may be reduced or prevented. As was described above, the GPS receiver 130 may be enabled continuously when the wireless communications receiver 120 is receiving wireless communications 142*a* and/or may be enabled selectively when it is desired to obtain GPS data.

In other embodiments, the controller 150 may also be configured to disable the wireless communications transmitter 110 and enable the GPS receiver 130, when the GPS receiver 130 has been disabled for a predetermined time and it is desired to obtain GPS data. The predetermined time may be constant, and/or variable based on one or more factors such as, for example, a system and/or user initiated input and/or a Time-of-Day (ToD) value, and may allow a GPS signal to be acquired and processed in a desired time frame, while reducing or preventing overload and/or other interference to the GPS receiver 130. Moreover, in other embodiments, when the GPS receiver 130 is enabled, a position of the radioterminal 110 is determined, and when the wireless communications transmitter 110 is enabled, the position that was determined can be transmitted via the wireless communications 142*a*.

Many techniques well known to those having skill in the art may be used to disable the GPS receiver 130 and/or the wireless communications transmitter 110. For example, the GPS receiver 130 may be disabled by disabling the GPS RF system 132 and/or the GPS DSP 134. Similarly, the wireless communications transmitter 110 may be disabled by disabling the wireless communications transmitter RF system 112 and/or the wireless communications transmitter DSP 114. Finally, according to yet other embodiments of the present invention, the wireless communications receiver 120 may be enabled (continuously and/or as desired) at the same time that the GPS receiver 130 is enabled and/or at the same time the wireless communications transmitter 110 is enabled. Moreover, the GPS receiver 130 may be enabled (continuously and/or as desired) when the wireless communications transmitter 110 is not transmitting wireless communications and when the wireless receiver 120 is not receiving wireless communications.

Figure 2:
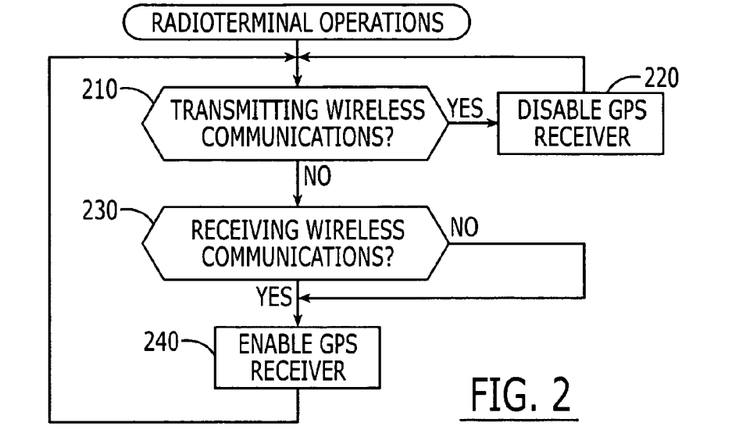
FIGS. 2 and 3 are flowcharts of operations that may be performed to control operations of radioterminals, such as radioterminals of FIG. 1, according to exemplary embodiments of the present invention.

FIG. 2 is a flowchart of operations that may be performed by a radioterminal, such as a radioterminal 100 of FIG. 1, according to various embodiments of the present invention. These operations may be performed by a controller, such as the controller 150 of FIG. 1, in some embodiments of the invention.

More specifically, referring to FIG. 2, at Block 210, if it is desired to transmit wireless communications, for example in response to a user activity at the MMI 160, then at Block 220, the GPS receiver 130 is disabled. On the other hand, at Block 210, if there is no need to transmit wireless communications, then, whether or not wireless communications are being received at Block 230, the GPS receiver 130 may be enabled at Block 240. Accordingly, operations of FIG. 2 may reduce or prevent overload and/or other degradation of GPS signal acquisition and/or processing by the transmissions of the wireless communications transmitter 110.

Figure 3:
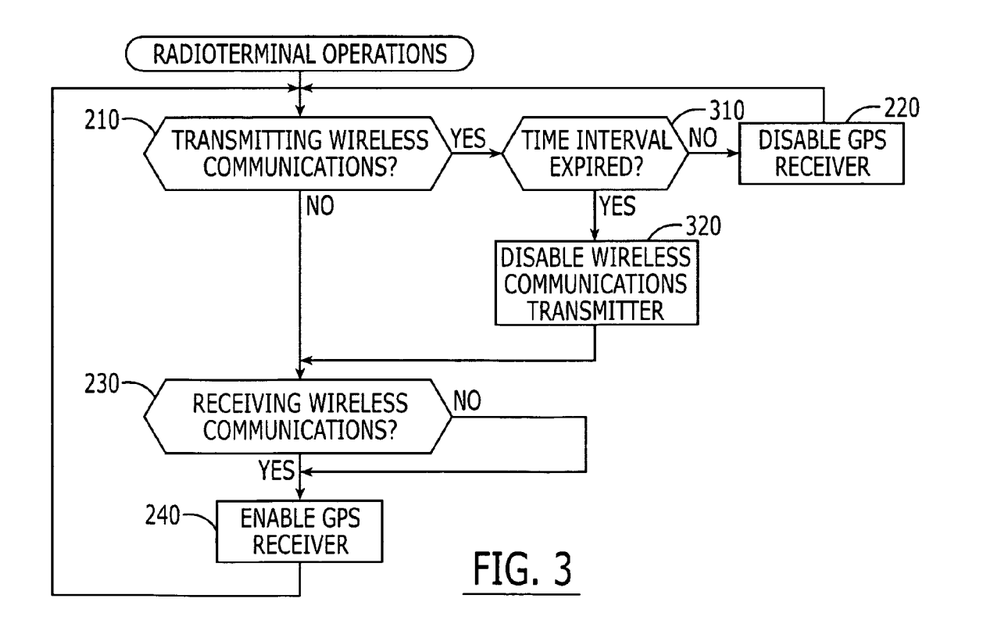

FIG. 3 is a flowchart of operations that may be performed according to other embodiments of the present invention. Again, these operations may be performed, for example, by the controller 150 in the radioterminal 100 of FIG. 1.

Referring to FIG. 3, if it is desired to transmit wireless communications at Block 210, a determination is first made at Block 310 as to whether a time interval has expired. The time interval may be determined based on a desired time for determining/estimating/tracking the position of the radioterminal, an input to the radioterminal by a user and/or system and/or a ToD value. The time interval may be greater than or equal to zero and may be constant or may be variable based on many factors, such as, for example, the telecommunications standard under which the radioterminal is operating, regulatory requirements, an acceleration, speed, velocity and/or position of the wireless terminal, a length of time it took to decode a previous GPS signal and/or to estimate a previous position of the radioterminal, a desired accuracy of the position determination, a user input, a system input, a ToD value and/or many other factors.

At Block 310, if the time interval has not expired, then the GPS receiver is disabled at Block 220. On the other hand, if the time interval has expired, then the wireless communications transmitter is disabled at Block 320, so as to allow a GPS signal to be received and processed substantially reliably. Operations of Blocks 230 and 240 may then proceed as was already described in connection with FIG. 2.

Figure 4:
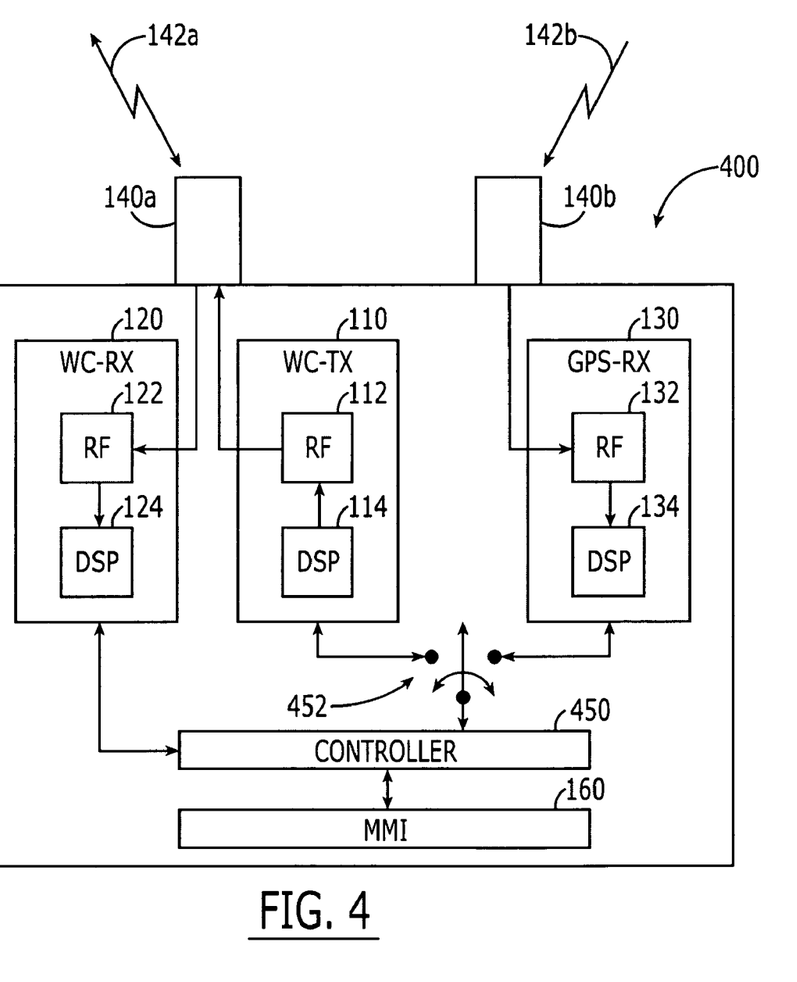
FIG. 4 is a functional block diagram of a radioterminal according to other exemplary embodiments of the present invention.

FIG. 4 is a functional block diagram of a radioterminal according to other exemplary embodiments of the present invention. According to these embodiments, the radioterminal 400 may be placed in a first or second mode by a controller and a switch. More specifically, the controller 450 is configured to control a switch 452, to switch the radioterminal between a first mode, wherein the GPS receiver 130 is disabled and the wireless communications transmitter 110 is enabled, and a second mode, wherein the GPS receiver 130 is enabled, and the wireless communications transmitter 110 is disabled.

It will be understood by those having skill in the art that the switch 452 denotes a functional component that may be embodied in a hardware and/or software function that is used to transition the radioterminal between the first and second modes. This function may be integrated, at least in part, with the controller 450, which itself may be integrated, at least in part, with the GPS receiver 130, the wireless communications transmitter 110, the wireless communications receiver 120 and/or the MMI 160. It also will be understood that, in some embodiments, the controller 450 is further configured to enable the wireless communications receiver 120 in the first and/or second modes. It yet other embodiments, the controller 450 may be further configured to switch the radioterminal to the second mode when the radioterminal has been operating in the first mode for a predetermined time, as was described above, for example, in connection with Block 310 of FIG. 3. It also will be understood that the controller 450 may be further configured to switch the radioterminal between the second mode, to determine the position of the radioterminal, and the first mode to transmit the position of the radioterminal. It also will be understood that embodiments of FIGS. 1-4 may be combined in various combinations and subcombinations.

Additional discussion of various embodiments of the present invention now will be provided. In particular, some embodiments of the present invention may arise from a recognition that a radioterminal may include an electronics system that includes wireless communications signal processing and GPS signal processing. The radioterminal may also be configured to transmit communications signals using frequencies that are proximate to the GPS band of frequencies and thus, may overload and/or otherwise degrade a performance measure of the GPS receiver of the radioterminal during an interval of communications signal transmission by the radioterminal. A GPS filter may be used by the GPS receiver, to reduce an overload state of the GPS receiver, as described in U.S. Pat. No. 6,785,543, but the GPS receiver may still experience some degree of overload and/or other degradation.

According to exemplary embodiments of the present invention, the radioterminal, being aware of a first time interval during which a communications signal is being transmitted by the radioterminal, may be configured to preferentially not conduct GPS signal processing during the first time interval. The radioterminal, also being aware of a second time interval during which the radioterminal is not transmitting a communications signal, may be configured to preferentially conduct GPS signal processing during the second time interval. Thus, the radioterminal may be configured to conduct preferential GPS signal processing responsive to an interval of time (or intervals of time) during which the radioterminal is not substantially transmitting a communications signal to thereby reduce or eliminate a GPS signal degradation (i.e., overload and/or in-band interference to a GPS signal) during the interval(s) of time of radioterminal communications transmissions silence. The interval(s) of time of radioterminal communications transmissions silence may occur naturally (as a consequence of the user of the radioterminal not transmitting voice and/or data communications) and/or the radioterminal may be configured to impose a period of communications transmissions silence if a predetermined interval of time elapses and a naturally occurring communications transmissions silence interval of an appropriate time duration has not occurred.

The radioterminal and/or a system component of a system that is configured to communicate with the radioterminal may be configured to determine a measure of a geographic position of the radioterminal based on GPS signal processing and/or other technique(s) conducted at the radioterminal and/or at the system and the radioterminal and/or the system may be configured to transmit the measure of the geographic position of the radioterminal to one or more other radioterminals that the radioterminal has authorized/approved to receive the geographic position (and/or a measure thereof) of the radioterminal. The one or more other radioterminals may be determined by an identity of the radioterminal and/or by the user of the radioterminal. The geographic position of the radioterminal may be transmitted to the one or more other radioterminals at a priori determined intervals of time, at specific (or approximate) values of time, periodically, non-periodically, deterministically, randomly, pseudo-randomly, responsive to a change and/or a rate of change of the position of the radioterminal and/or responsive to a user command.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A radioterminal comprising:
a wireless communications transmitter;
a wireless communications receiver;
a global positioning system (GPS) receiver including a GPS radio frequency (RF) system and a GPS signal processing system; and
a controller that is configured to enable the GPS receiver when the wireless communications receiver is receiving wireless communications and to disable the GPS receiver when the wireless communications transmitter is transmitting wireless communications;
wherein the controller is further configured to disable the wireless communications transmitter and enable the GPS RF system and the GPS signal processing system to receive and process GPS signals, respectively, when the GPS RF system and the GPS signal processing system have been disabled for a predetermined time, wherein the predetermined time comprises a variable predetermined time, and to send a measure of location of the radioterminal to at least one other radioterminal, wherein an identity of the radioterminal is used to determine the at least one other radioterminal and the measure of location of the radioterminal is sent to the at least one other radioterminal responsive to a change of position of the radioterminal and responsive to a rate of change of position of the radioterminal.

2. A radioterminal according to claim 1 wherein the controller is further configured to enable the GPS receiver when the wireless communications receiver is receiving wireless communications to determine a position of the radioterminal and to disable the GPS receiver when the wireless communications transmitter is transmitting wireless communications to transmit the position of the radioterminal.

3. A radioterminal according to claim 1 wherein the controller is configured to disable the GPS receiver by disabling the GPS RF system and/or the GPS signal processing system.

4. A radioterminal according to claim 1 wherein the wireless communications transmitter comprises a wireless communications transmitter RF system and a wireless communications transmitter signal processing system and wherein the controller is configured to disable the wireless communications transmitter by disabling the wireless communications transmitter RF system and/or the wireless communications transmitter signal processing system.

5. A radioterminal according to claim 1 wherein the controller is further configured to enable the GPS receiver when the wireless communications transmitter is not transmitting wireless communications and the wireless communications receiver is not receiving wireless communications.

6. A radioterminal according to claim 1 wherein the variable predetermined time is based upon a telecommunications standard and other regulatory requirements under which the radioterminal is operating.

7. A radioterminal according to claim 1 wherein the variable predetermined time is based upon an acceleration, speed, velocity and position of the radioterminal.

8. A radioterminal according to claim 1 wherein the variable predetermined time is based upon a length of time it took to decode a previous GPS signal and/or to estimate a previous position of the radioterminal and a desired accuracy of a position determination.

9. A radioterminal according to claim 1 wherein the variable predetermined time is based upon a user input, a system input and a time-of-day value.

10. A radioterminal comprising:
a wireless communications transmitter;
a wireless communications receiver;
a global positioning system (GPS) receiver including a GPS radio frequency (RF) system and a GPS signal processing system; and
a controller that is configured to switch the radioterminal between a first mode, wherein the GPS RF system and the GPS signal processing system are disabled and the wireless communications transmitter is enabled, and a second mode, wherein the GPS RF system and the GPS signal processing system are enabled to receive and process GPS signals, respectively, and the wireless communications transmitter is disabled;
wherein the controller is further configured to switch the radioterminal to the second mode when the radioterminal has been in the time, wherein the redetermined time comprises a variable predetermined time, and to send a measure of location of the radioterminal to at least one other radioterminal, wherein an identity of the radioterminal is used to determine the at least one other radioterminal and the measure of location of the radioterminal is sent to the at least one other radioterminal responsive to a change of position of the radioterminal and responsive to a rate of change of position of the radioterminal.

11. A radioterminal according to claim 10 wherein the controller is further configured to enable the wireless communications receiver in the first and/or second modes.

12. A radioterminal according to claim 10 wherein the controller is further configured to switch the radioterminal between the second mode to determine a position of the radioterminal and the first mode to transmit the position of the radioterminal.

13. A radioterminal according to claim 10 wherein the variable predetermined time is based upon a telecommunications standard and other regulatory requirements under which the radioterminal is operating.

14. A radioterminal according to claim 10 wherein the variable predetermined time is based upon an acceleration, speed, velocity and position of the radioterminal.

15. A radioterminal according to claim 10 wherein the variable predetermined time is based upon a length of time it took to decode a previous GPS signal, a length of time it took to estimate a previous position of the radioterminal and a desired accuracy of a position determination.

16. A radioterminal according to claim 10 wherein the variable predetermined time is based upon a user input, a system input and a time-of-day value.

17. A method of operating a radioterminal that includes a wireless communications transmitter, a wireless communications receiver, and a globalpositioning system (GPS) receiver including a GPS radio frequency (RF) system and a GPS signal processing system, the method comprising:
switching the radioterminal between a first mode, wherein the GPS RF system and the GPS signal processing system are disabled and the wireless communications transmitter is enabled, and a second mode, wherein the GPS RF system and the GPS signal processing system are enabled to receive and process GPS signals, respectively, and the wireless communications transmitter is disabled;
switching the radioterminal to the second mode when the radioterminal has been in the first mode for a predetermined time, wherein the predetermined time comprises a variable predetermined time; and
sending a measure of location of the radioterminal to at least one other radioterminal, wherein an identity of the radioterminal is used to determine the at least one other radioterminal and the measure of location of the radioterminal is sent to the at least one other radioterminal responsive to a change of position of the radioterminal and responsive to a rate of change of position of the radioterminal.

18. A method according to claim 17 further comprising:
enabling the wireless communications receiver in the first and/or second modes.

19. A method according to claim 17 wherein switching further comprises switching the radioterminal between the second mode to determine a position of the radioterminal, and the first mode to transmit the position of the radioterminal.

20. A method according to claim 17 wherein the variable predetermined time is based upon a telecommunications standard and other regulatory requirements under which the radioterminal is operating.

21. A method according to claim 17 wherein the variable predetermined time is based upon an acceleration, speed, velocity and position of the radioterminal.

22. A method according to claim 17 wherein the variable predetermined time is based upon a length of time it took to decode a previous GPS signal, a length of time it took to estimate a previous position of the radioterminal and a desired accuracy of a position determination.

23. A method according to claim 17 wherein the variable predetermined time is based upon a user input, a system input and a time-of-day value.

* * * * *

UNITED STATES PATENT AND TRADEMARK OFFICE
CERTIFICATE OF CORRECTION

PATENT NO. : 7,453,396 B2  Page 1 of 1
APPLICATION NO. : 11/098288
DATED : November 18, 2008
INVENTOR(S) : Levin et al.

It is certified that error appears in the above-identified patent and that said Letters Patent is hereby corrected as shown below:

Column 9, Claim 10, Line 22: Please correct "systemand" to read -- system and --

Column 9, Claim 10, Line 34: Please correct "in the time" to read -- in the first mode for a predetermined time --

Column 9, Claim 10, Line 34: Please correct "redetermined" to read -- predetermined --

Column 10, Claim 17, Line 10: Please correct "awireless" to read -- a wireless --

Column 10, Claim 17, Line 11: Please correct "globalpositioning" to read -- global positioning --

Column 10, Claim 17, Line 23: Please correct "thefirst" to read -- the first --

Column 10, Claim 17, Line 25: Please correct "variablepredetermined" to read -- variable predetermined --

Signed and Sealed this

Thirtieth Day of December, 2008

JON W. DUDAS
*Director of the United States Patent and Trademark Office*